United States Patent
Nakamura et al.

[11] Patent Number: 6,034,948
[45] Date of Patent: Mar. 7, 2000

[54] SYSTEM FOR TESTING REPEATING INSTALLATION

[75] Inventors: Tetsuzi Nakamura; Kazuhiro Matsushita, both of Kawasaki, Japan

[73] Assignee: Fujitsu Limited, Kawasaki, Japan

[21] Appl. No.: 08/913,814

[22] PCT Filed: Jan. 24, 1997

[86] PCT No.: PCT/JP97/00168

§ 371 Date: Sep. 24, 1997

§ 102(e) Date: Sep. 24, 1997

[30] Foreign Application Priority Data

Jan. 24, 1996 [JP] Japan ................................ 8-009946

[51] Int. Cl.[7] .......................... G01R 31/08; G06F 11/00; G08C 15/00; H04M 1/24
[52] U.S. Cl. .......................... 370/246; 370/246; 370/242; 370/243; 370/249; 379/21; 379/29; 379/90
[58] Field of Search .................................. 370/242, 243, 370/246, 248, 249, 251; 379/21, 29, 90, 201; 371/20, 37, 5.1, 39

[56] References Cited

U.S. PATENT DOCUMENTS

| | | | |
|---|---|---|---|
| 4,945,532 | 7/1990 | Hald | 370/13 |
| 5,132,975 | 7/1992 | Avaneas | 371/37.6 |
| 5,163,051 | 11/1992 | Biessman et al. | 371/5.1 |
| 5,309,428 | 5/1994 | Copley et al. | 370/17 |
| 5,608,720 | 3/1997 | Biegel et al. | 370/249 |
| 5,710,760 | 1/1998 | Moll | 370/249 |

FOREIGN PATENT DOCUMENTS

| | | |
|---|---|---|
| 1-204547 | 8/1989 | Japan . |
| 2-072737 | 3/1990 | Japan . |
| 2-299343 | 12/1990 | Japan . |
| 5-007204 | 1/1993 | Japan . |
| 6-164626 | 6/1994 | Japan . |
| 7-177180 | 7/1995 | Japan . |

*Primary Examiner*—Michael Horabik
*Assistant Examiner*—Man Phan
*Attorney, Agent, or Firm*—Staas & Halsey LLP

[57] ABSTRACT

A system tests a repeating installation having transmitter-receivers (3, 4) and a line controller (2). The system includes the repeating installation to be tested, a first tester (10), a second tester (11), an input unit (12) for entering a first virtual network into the first tester (10), an input unit (13) for entering a second virtual network into the second tester (11), and a line control table which is provided for the transmitter-receiver (3) and into which the destination transmitter-receiver (4) is written according to address information added to the data input to the transmitter-receiver (4). Test data transmitted from the first tester to the virtual network of the second tester is received by the second tester, and the received test data is examined. This greatly reduces facility costs and installation space and realizes performance evaluation of a repeating installation under a large-scale network environment.

14 Claims, 11 Drawing Sheets

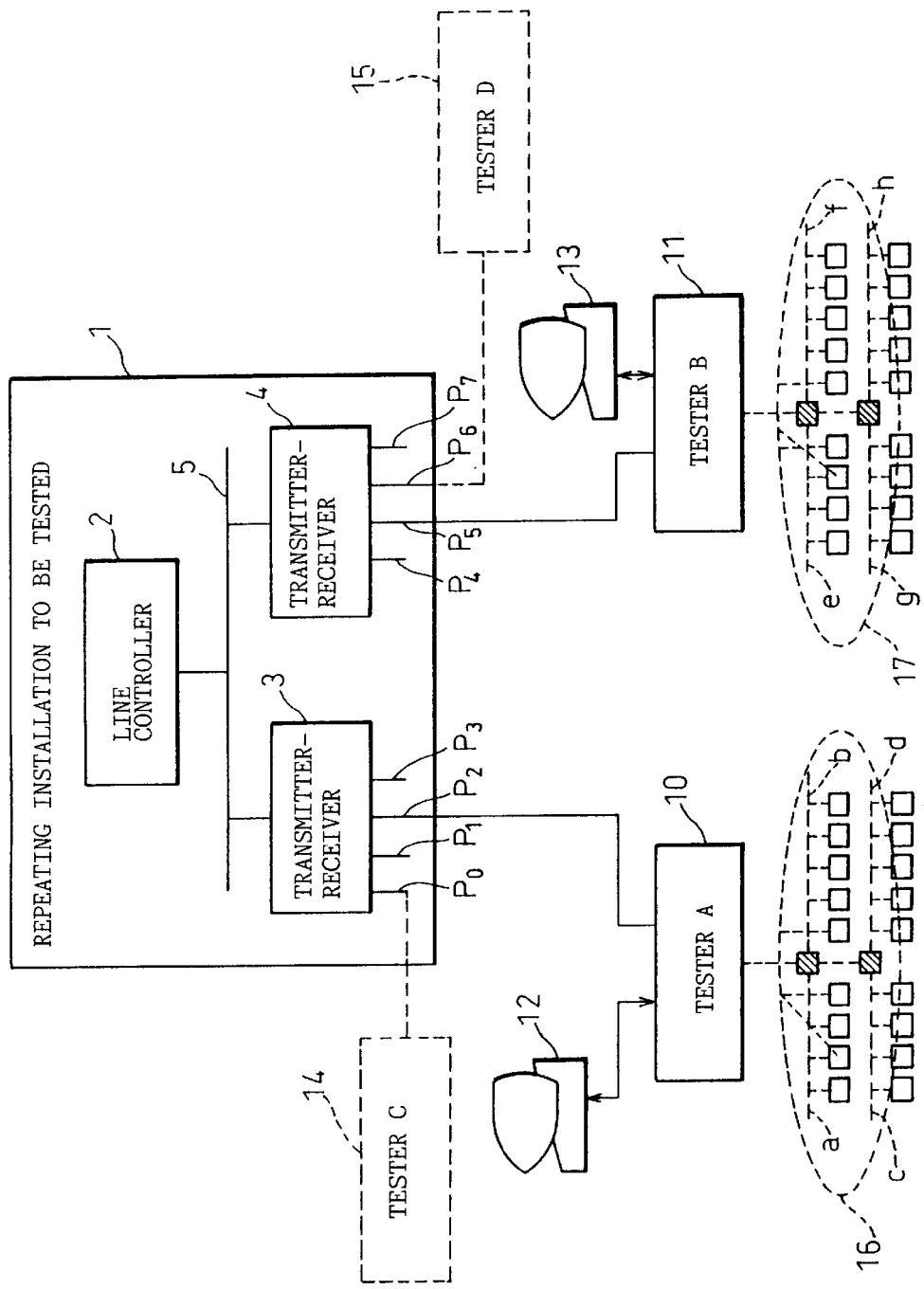

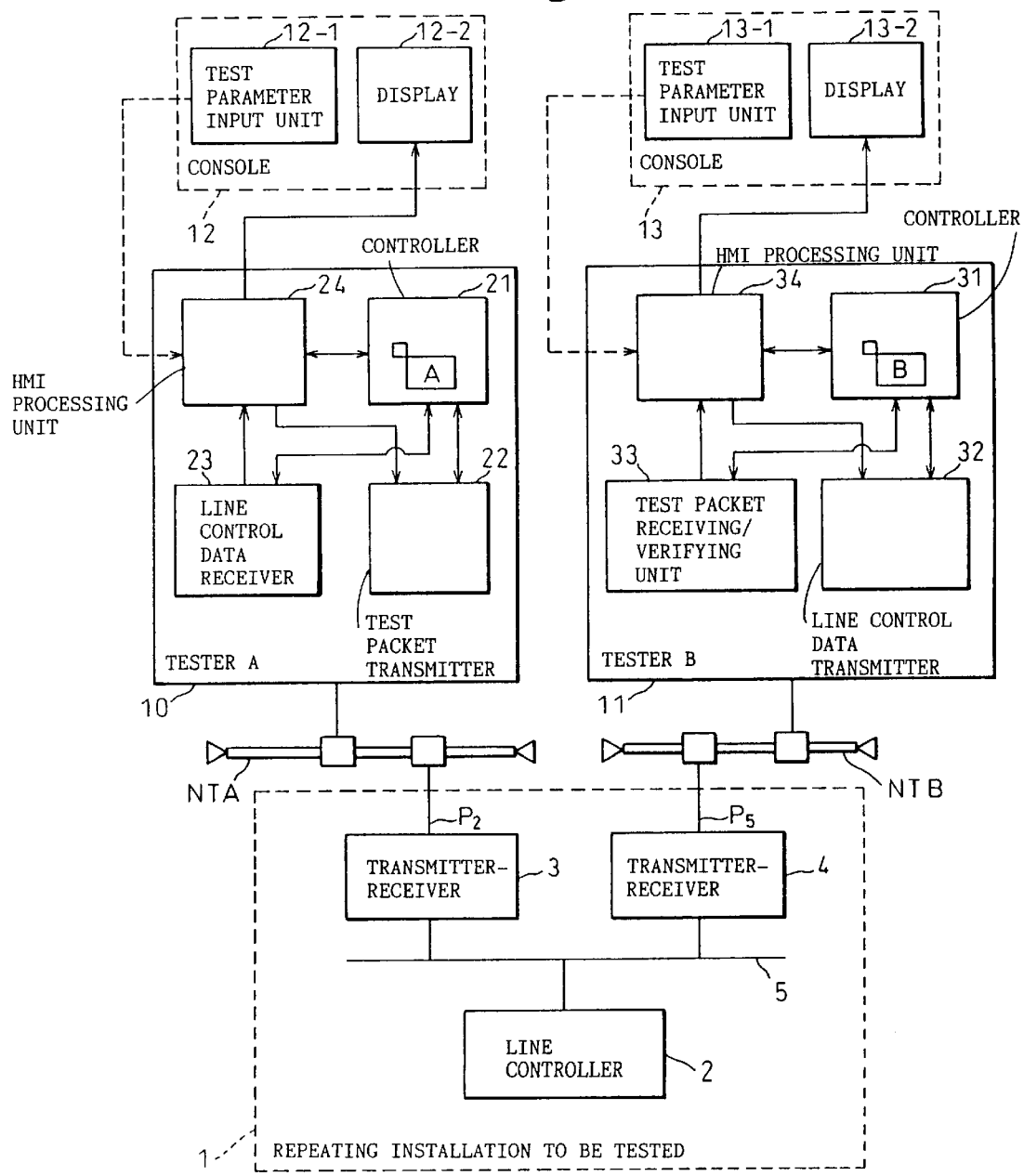

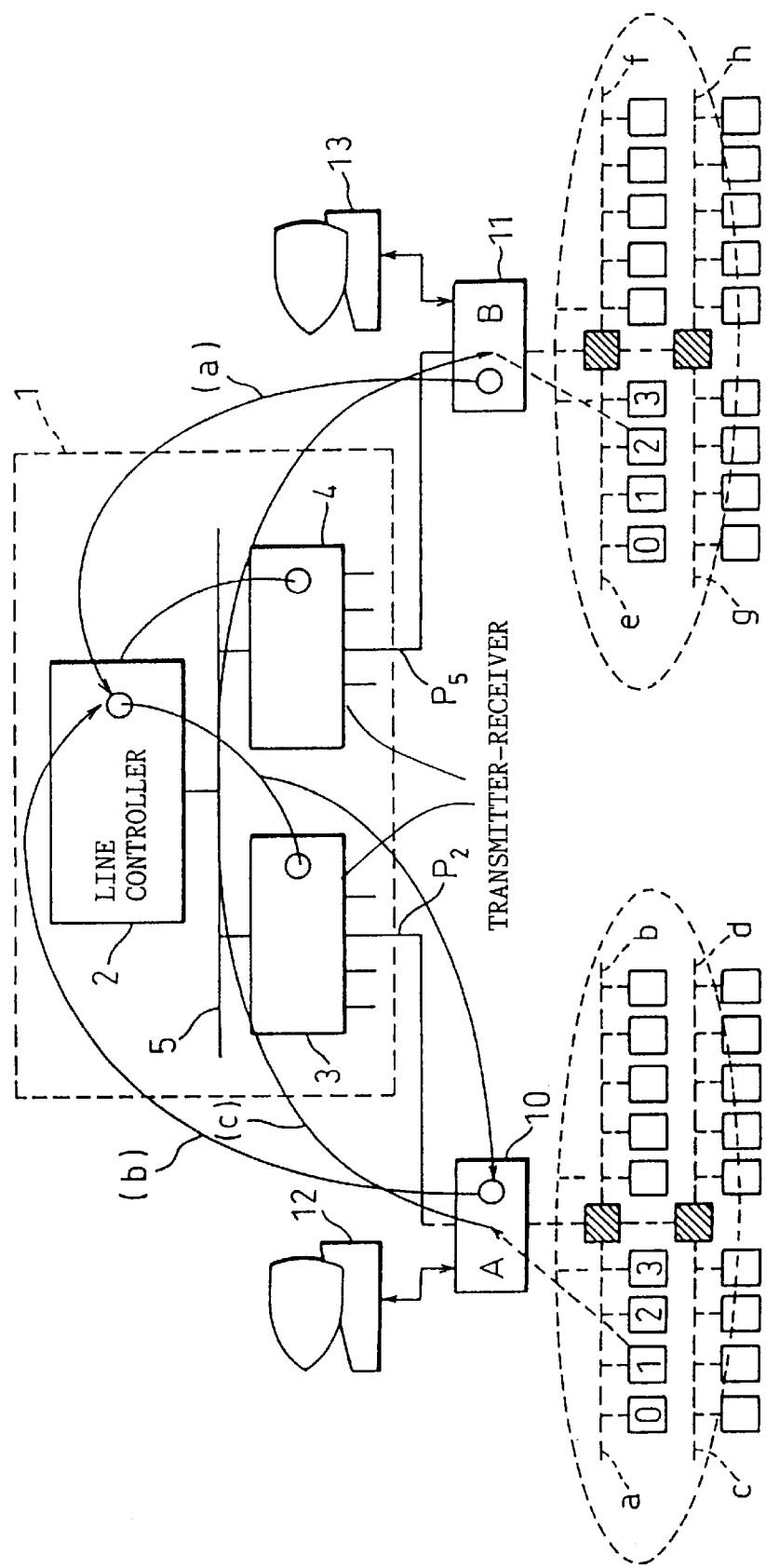

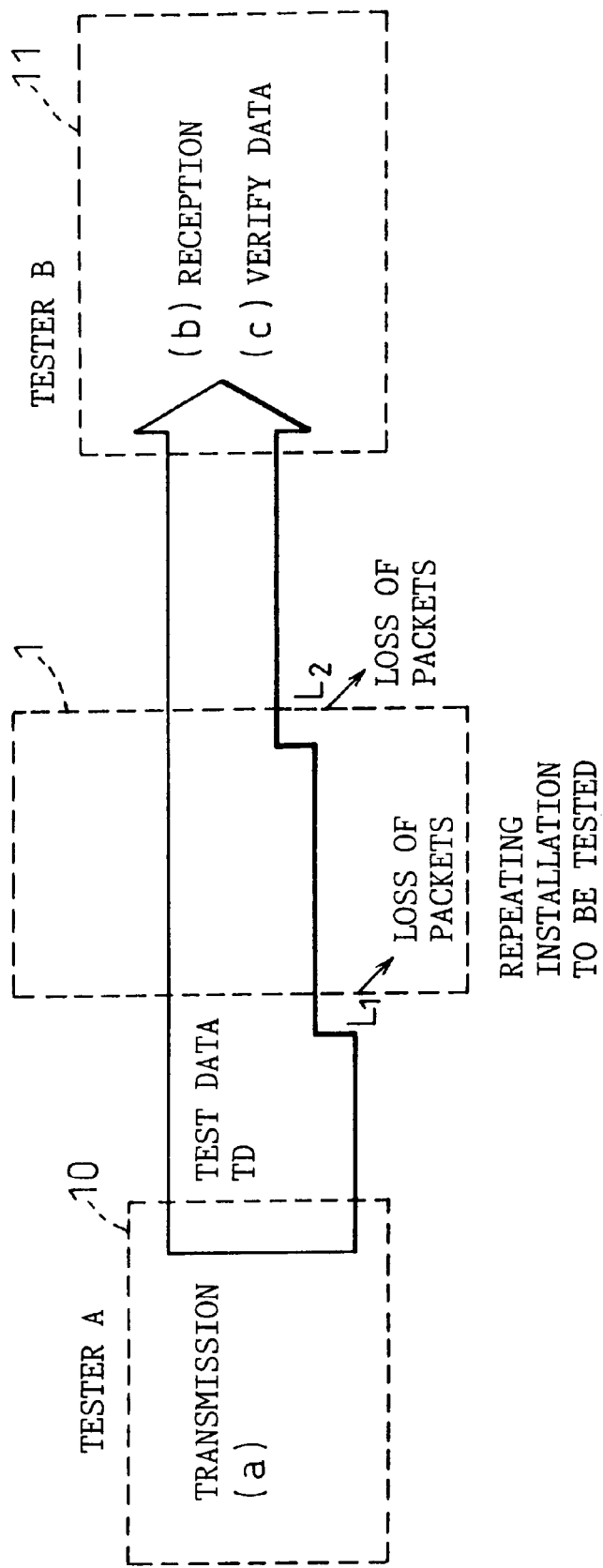

Fig. 8A
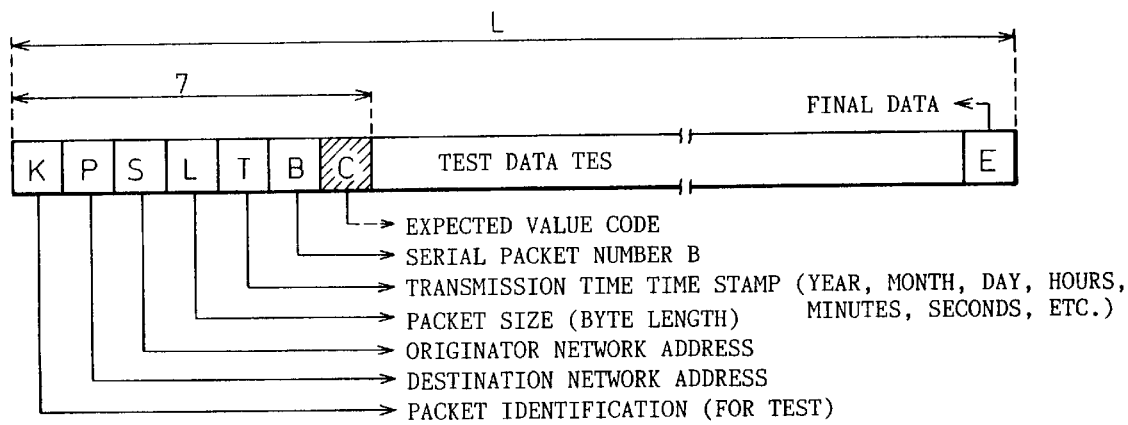
Fig. 8B
$(C) + (L-7) = (E)$
WHEN $C = 13$
$L = 20$,
THEN
$E = 26$
Fig. 8C
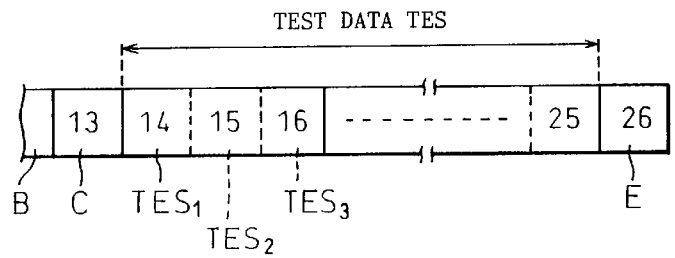

(REPEAT TRANSMISSION)

(CHANGE OF SIGNAL)

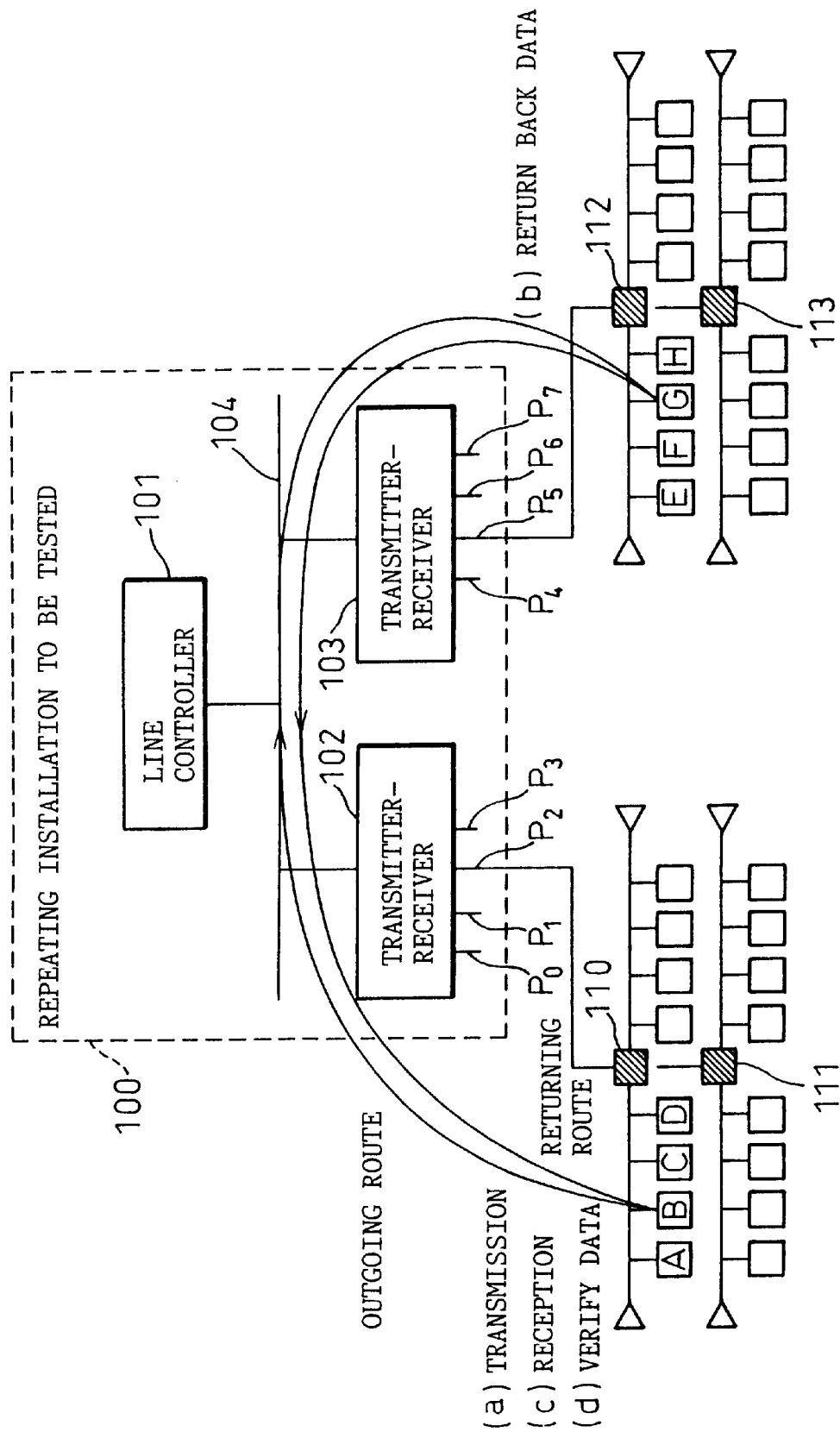

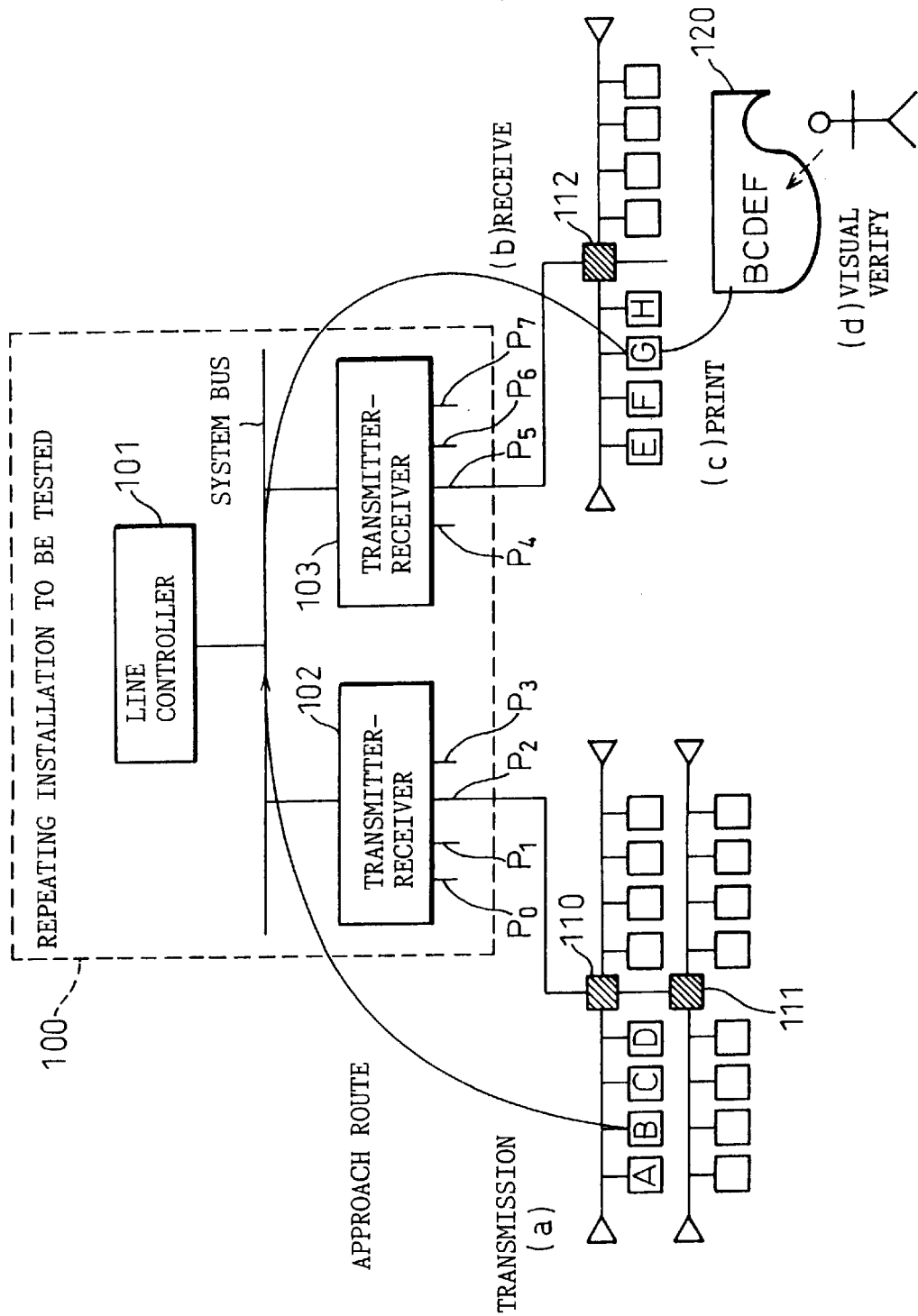

SYSTEM FOR TESTING REPEATING INSTALLATION

TECHNICAL FIELD

The present invention relates to a system for testing a repeating installation having networks connected to terminals, and particularly, to one capable of, without physically installing and constituting testing network media and testing terminals for test environmental facilities, carrying out evaluations such as testing the repeating function of a repeating installation and verifying various kinds of protocol data and a variety of repeating data.

BACKGROUND ART

Generally, when testing, for example, a newly developed repeating installation at, for example, a factory at the time of shipment of the product, the repeating installation 100 to be tested is combined with various types of external test terminals A, B, C, D, E, F, G, H, and the like through repeating installations 110, 111, 112, 113, and the like and network media, as shown in FIG. 11A, so that data may be returned. The external test terminal B, for example, transmits test data to the external test terminal G through the repeating installation 100, the external test terminal G returns the same, the external test terminal B checks the returned result, and according to the returned result, the repeating connection function of the repeating installation 100 is verified.

At this time, the received data at the external test terminal B is compared with expected value data prepared in advance, to verify the transmission and reception functions of the repeating installation 100 and detect data errors.

In FIG. 11A, the repeating installation 100 has a line controller 101 for controlling lines, a transmitter-receiver 102 having transmission-reception paths $P_0$ to $P_3$, and a transmitter-receiver 103 having transmission-reception paths $P_4$ to $P_7$.

The line controller 101 controls the preparation of a line control table for the transmitter-receivers 102 and 103, to indicate a transmission-reception path corresponding to a destination terminal. For example, when data is transmitted and received between the test terminals B and G, the transmitter-receiver 102 is provided with a line control table (not shown) that is prepared according to an instruction from the line controller 101 and contains line control data indicating a route to the test terminal G through the transmission-reception path $P_5$, and the transmitter-receiver 103 is provided with a line control table (not shown) that is similarly prepared and contains line control data indicating a route to the test terminal B through the transmission-reception path $P_2$.

In the repeating installation 100, when the test terminal B sends data for the test terminal G, the transmitter-receiver 102 refers to the line control table, recognizes that the transmission-reception path of the destination is $P_5$, adds the same to the data, and sends them to a system bus 104. Then, the transmitter-receiver 103 fetches the data and sends the same to the test terminal G through the transmission-reception path $P_5$.

After receiving the data, the test terminal G returns it to the test terminal B. At this time, the transmitter-receiver 103 of the repeating installation 100 refers to the line control table, recognizes that the transmission-reception path of the destination is $P_2$, adds the same to the data, and sends them to the system bus 104. Consequently, the transmitter-receiver 102 fetches the data and sends it to the test terminal B through the transmission-reception path $P_2$.

In this way, the terminal B refers to results of the returned and received test data, to verify the repeating function of the repeating installation 100, and compares the received test data with expected value data prepared in advance, to verify transmission and reception functions and detect data errors.

Conventionally, a repeating installation is tested by connecting various kinds of network media to all transmission-reception paths of the repeating installation. Recent improvements in the capacity and functions of repeating installations, however, are increasing transmission-reception paths and the kinds of test terminals, and therefore, it is impossible in terms of test facility costs and installation space costs to prepare all test facilities, i.e., all kinds of network media and all kinds of test terminals. In addition, simply connecting the transmission-reception paths of a repeating installation to network media and test terminals is insufficient to completely evaluate all of the connection functions of the repeating installation.

According to the conventional test mentioned above, the transmission-reception paths $P_0$ to $P_3$ and $P_4$ to $P_7$ of the transmitter-receivers 101 and 102 of the repeating installation 100 to be tested are connected to physical network media and test terminals, and tests are carried out. However, the number of network media installed in a testing environment and the number of test terminals connected to them are limited.

Due to this, it is impossible to test the repeating function of a repeating installation with the maximum number or a number larger than the maximum number of paths related to the line control data of the repeating installation. Although the line control data is dynamically updated at intervals of, for example, 30 seconds, it is impossible to test the repeating function under a state that simultaneously involves the maximum number of paths and the dynamic updating.

A conventional protocol test arranges and connects a repeating installation to at least two terminals that operate on different protocols, manually handles OSs that support the protocols, and carries out tests. The manual operation, however, involves troublesome works and mistakes when preparing test data and verifying the data. In addition, there are several tens of protocols, and therefore, there are some limitations on always installing a testing environment having terminals that support the respective protocols and operating their OSs.

Further, the repeating installations have a function of parallel operations of various kinds of such protocols. Testing such function manually as mentioned above, however, involves protocol interference tests that may differ every time, and, in addition, it is difficult to reproduce a fault.

If a terminal is provided with a test tool for every protocol, the number of development processes will be increased because tool developing environments differ from each another depending on the OS that supports the protocol, and therefore, it is possible to prepare only same test tools and it is difficult to test all protocols.

A conventional data test transmits test data from a sender terminal through a repeating installation to be tested, returns the test data from a receiver terminal, and confirms the returned test data at the sender terminal.

Due to data congestion in network media and the repeating installation, however, the test data is sometimes abandoned, and the probability of abandoning the test data is doubled in outgoing and returning paths, compared with a one-way system resulting in a low test efficiency. If data errors occur, it is difficult to specify which of the outgoing and returning paths has caused the errors.

The conventional data test transmits test data (packets) from a test terminal, i.e., a sender terminal, returns the test data from an opposite receiver terminal to the original sender terminal, and confirms the returned test data at the sender terminal. After the confirmation, the next test data is transmitted and processed.

Accordingly, the sender terminal has overheads for the reception process and for the data confirmation process, to cause an idle time, i.e., a waiting time between the first test data transmission and the next test data transmission. Accordingly, it is impossible to test a repeating installation by substantially continuously transmitting test data thereto. Namely, it is impossible to apply a large reception load to the repeating installation.

Further, a test terminal receives test data through a physical layer (hardware)→a driver layer→a dispatcher (scheduler)→a network kernel layer. Whenever received data is handed over among these layers, an overhead for a memory copy process is involved, to deteriorate the processing performance of the test terminal and cause data congestion in each layer. This results in abandoning test data (packets), thereby deteriorating testing efficiency.

Conventionally, received protocol data is examined, as shown in FIG. 11B, by connecting, for example, a printer 120 to a test terminal G, so that the printer 120 may print the received data and an operator may examine the data by his eyes. Alternatively, the test terminal G is provided with a disk unit (not shown) to store the received test data, so that the stored data is displayed on a display unit and an operator verifies the data on the display unit by his eyes.

Accordingly, confirming data by eyes takes a long time, and since it is a monotonous work, involves confirmation oversight mistakes. It is impossible to confirm each piece of a large amount of data such as test data, and also, it is impossible to confirm data when the data is continuously transmitted and received.

Still further, when a packet loss rate is calculated according to a test data return method, it is impossible to determine which of the outgoing and the returning paths has caused a packet loss. It is also impossible for the prior art to calculate a packet loss rate according to a data outgoing path method because the total number (modulus) of transmitted packets cannot be confirmed at a receiver data terminal alone.

By the way, the prior art verifies the number of networks which can be repeated at one time by recording in a table or printing packet destination addresses received at a repeating installation for a display test. After the test, the destination addresses is calculated by reviewing the recorded or printed results. There are, however, several thousands to several tens of thousands networks, and therefore, the capacity of the recording table must be large, and a long time is needed to update the table.

DISCLOSURE OF INVENTION

To solve the above-mentioned problems, the present invention provides a system for testing a repeating installation having a plurality of transmitter-receivers and a line controller provided with a control table that indicates a relationship between address information added to input data to a transmitter-receiver and a transmitter receiver to which the data must be transmitted.

The system includes a first tester connected to one of the transmitter-receivers, a second tester connected to another of the transmitter-receivers, an input unit for entering the address of a first virtual network or terminal that is not physically present in the first tester, and an input unit for entering the address of a second virtual network that is not physically present in the second tester. The first tester sends test data to the virtual network or terminal of the second tester, and the second tester receives the test data through the repeating installation to be tested and examines the received test data.

BRIEF DESCRIPTION OF THE DRAWINGS

FIG. 1 shows the principle of the present invention;

FIG. 2 shows an embodiment of the present invention;

FIGS. 3A to 3C explain a virtual network test according to the present invention;

FIG. 5 explains an outgoing path one-way test according to the present invention;

FIGS. 8A to 8C explain the logical verification of test data according to the present invention;

FIGS. 11A and 11B explain a prior art.

BEST MODES FOR EMBODYING THE INVENTION

Figure 3B:
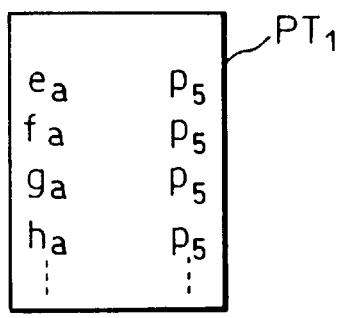

FIG. 1 shows the principle of the present invention. According to the present invention, as shown in FIG. 1, a repeating installation 1 to be tested has a line controller 2, transmitter-receivers 3 and 4, and a system bus 5 and is tested by connecting, for example, a transmission-reception path $P_2$ of the transmitter-receiver 3 to a tester 10 and a transmission-reception path $P_5$ of the transmitter-receiver 4 to a tester 11. The tester 10 is connected to a console 12, and the tester 11 is connected to a console 13. A virtual network 16 consists of, for example, dummy networks a, b, c, and d, and a virtual network 17 consists of, for example, dummy networks e, f, g, and h.

When testing the repeating installation 1, the console 13 is used to enter the addresses of, for example, the dummy networks e, f, g, and h of the virtual network 17 into the tester 11, and the tester 11 transmits them to the repeating installation 1.

Accordingly, the line controller 2 recognizes that the dummy networks e, f, g, and h of the virtual network 17 are connected to the transmission-reception path $P_5$ of the transmitter-receiver 4 and sets line control data indicating that the dummy networks e, f, g, and h are connected to the transmission-reception path $P_5$ in a line control table (not shown) for the transmitter-receivers 3 and 4. Also, the addresses of the dummy networks e, f, g, and h are transmitted to the tester 10.

Upon receiving the addresses of the dummy networks e, f, g, and h, the tester 10 compares them with expected values prepared in advance to see if they agree with each other. If they agree with each other, the console 12 is used to enter test data, which is sequentially provided with the addresses of the dummy networks e, f, g, and h of the virtual network 17, and the test data is sequentially transmitted to the repeating installation 1. The transmitter-receiver 3 of the repeating installation 1 accesses the line control table according to the addresses of the dummy networks e, f, g, and h and recognizes that the dummy networks e, f, g, and h are connected to the transmission-reception path $P_5$ of the transmitter-receiver 4. The line controller 2 transfers the test data to the transmitter-receiver 4, which sequentially transmits the test data through the transmission-reception path $P_5$.

As a result, the test data is received by the tester 11. The tester 11 holds the test data to be transmitted from the tester 10 in advance and compares the same with the received test data, to detect the correctness of the received test data. Alternatively, as will be explained later, the test data may have an expected value code, which is used to logically check the correctness of the test data.

In this case, the tester 11 sends, as destinations, the addresses of dummy networks e, f, g, and h at regular intervals to the tester 10 through the repeating installation 1 and the transmitter-receiver 3. Then, the repeating installation 1 checks the line control table at regular intervals, and the tester 10 checks to see if the addresses of the dummy networks e, f, g, and h are equal to expected values, thereby testing a returning route, too.

In this way, under a virtual network environment, the data repeating function of a repeating installation to be tested is further provided with transmission and reception functions to form a terminal function, and test data is transmitted between terminals through the repeating installation, to verify a repeating path recognizing function and the correctness of communication data.

Further in this case, by entering dummy network addresses, it is possible to test the repeating installation without actually preparing large-scale networks and many terminals but with only a small number of actual networks and a small number of repeating installations.

In addition, a tester may forcibly transmit line control data as dummy information to a repeating installation to be tested, to test the line controlling function of the repeating installation.

Needless to say, a transmission-reception path $P_0$ of the transmitter-receiver 3 may be connected to a tester 14 having the same structure as the tester 10, and a transmission-reception path $P_6$ of the transmitter-receiver 4 to a tester 15 having the same structure as the tester 11, to carry out similar tests.

An embodiment of the present invention will be explained based on FIG. 2 with reference to the other figures. FIG. 2 shows the structure of the embodiment of the present invention, and the same reference symbols as those of the other figures represent like parts. Reference numeral 1 is a repeating installation to be tested, 2 is a line controller, 3 is a transmitter-receiver, 4 is a transmitter-receiver, 5 is a system bus, 10 is a tester 10, 11 is a tester, 12 is a console, 13 is a console, 21 is a controller, 22 is a test packet transmitter, 23 is a line control data receiver, 24 is a human-machine interface processing unit, 31 is a controller, 32 is a line control data transmitter, 33 is a test packet receiving/verifying unit, and 34 is a human-machine interface processing unit.

The repeating installation 1 is tested to see if its functions are correct and is connected to the line controller 2 and the transmitter-receivers 3 and 4 through the system bus 5.

The tester 10 transmits test data to dummy networks virtually connected to the tester 11 and checks to see if the addresses of the dummy networks sent from the tester 11 are correct. The tester 10 has the controller 21 for running a test program A, the test packet transmitter 22 for transmitting test data in packets, the line control data receiver 23 for receiving line control data from a network NTA, and the human-machine interface processing unit 24 for receiving data entered into the console 12, transferring the data to the controller 21, test packet transmitter 22, etc., and providing data to be transmitted from the tester 10 to the console 12.

The tester 11 transmits dummy network addresses that are the destinations of test data necessary for testing the repeating installation 1 and receives test data through the repeating installation 1, to carry out various kinds of checks including whether or not the received test data is correct, as will be explained later. The tester 11 has the controller 31 for running a test program B, the line control data transmitter 32 for transmitting the addresses of dummy networks e, f, g, h, and the like, the test packet receiver 33 for receiving test packets transmitted through the repeating installation 1 and examining the contents thereof, the man-machine interface processing unit 34 for receiving data entered into the console 13, transferring the same to the controller 31 and line control data transmitter 32, and providing data to be transmitted from the tester 11 to the console 13.

The console 12 is used to enter, into the tester 10, various kinds of data necessary for a test such as the dummy network addresses of a test object and commands, and to display test results. The console 12 has a test parameter input unit 12-1 such as a keyboard, a display 12-2, etc.

The console 13 is used to enter, into the tester 11, various kinds of data necessary for a test such as the dummy network addresses of a test object and commands, and to display test results. The console 13 has a test parameter input unit 13-1 such as a keyboard, a display 13-2, etc.

Next, the operations characteristic to the present invention will be explained.

(1) Data communication test under virtual network

When carrying out a data communication test, as shown in FIG. 3A, (a) the console 13 of the tester 11, for example, is used by an operator to enter the addresses ea, fa, ga, and ha of dummy networks e, f, g, and h that form a virtual network working under the tester 11. The tester 11 transmits them to the line controller 2 of the repeating installation 1 to be tested, according to a line control protocol. The line controller 2 recognizes that the addresses ea, fa, ga, and ha of the dummy networks e, f, g, and h transmitted from the tester 11 have arrived through a transmission-reception path $P_5$ of the transmitter-receiver 4 and sets a line control table PT1 shown in FIG. 3B in the transmitter-receiver 3. The table PT1 specifies that the dummy networks having the addresses ea, fa, ga, and ha are connected to the transmission-reception path $P_5$.

The line controller 2 makes the transmitter-receiver 3 transmit the dummy network addresses ea, fa, ga, and ha to the tester 10. In the tester 10, the line control data receiver 23 receives the dummy network addresses ea, fa, ga, and ha and transfers them to the controller 21. The controller 21 determines whether or not they are correct by comparing them with expected values held in advance and displays a result of the determination on the display 12-2 through the HMI processing unit 24. Then, the operator is able to check to see if the line control data has been correctly transmitted from the tester 11.

Figure 3C:
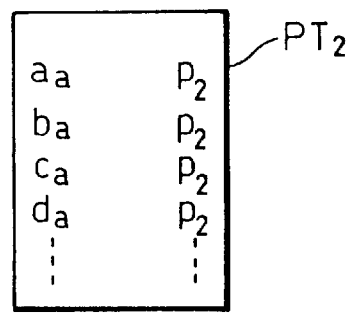
Figure 4:
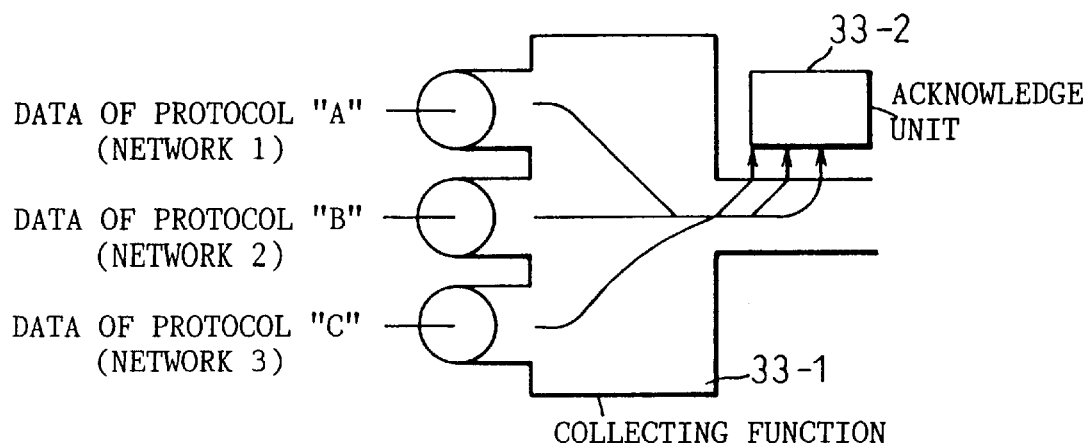
FIG. 4 explains the operation of a test packet receiving and verifying unit of a tester.

(b) Next, the console 12 of the tester 10 is used by the operator to enter the addresses aa, ba, ca, and da of dummy networks a, b, c, and d that form a virtual network working under the tester 10. In the same manner, the addresses are transmitted from the tester 10 to the line controller 2 of the repeating installation 1 to be tested. The line controller 2 recognizes that the addresses aa, ba, ca, and da of the dummy networks a, b, c, and d transmitted from the tester 10 have arrived through a transmission-reception path $P_2$ and sets a line control table PT2 shown in FIG. 3C in the transmitter-receiver 4. The table PT2 specifies that the dummy networks having the addresses aa, ba, ca, and da are connected to the transmission-reception path $P_2$.

(c) Thereafter, through the console 12 of the tester 10, for example, test data with a dummy network address of, for example, "ea" is transmitted. The transmitted test data is received by the transmitter-receiver 5 of the repeating installation 1, and according to the address ea, the line control table PT1 is accessed to recognize that the test data must be transmitted through the transmission-reception path $P_5$. Then, the test data is transmitted from the transmission-reception path $P_5$ of the transmitter-receiver 4 to the tester 11. The received test data is subjected to various checks to be explained later, thereby testing the repeating installation 1. Similarly, the tester 11 may send test data to the tester 10, to test the repeating installation 1.

In this way, by employing a virtual network having many dummy networks without actually installing network media that are expensive and need space, it is possible to evaluate a repeating installation with network addresses exceeding a maximum allowed for the repeating installation.

If the tester 10 forcibly requests line control data and receives it within a short time, the following effects will be provided:

a. increasing load on a repeating installation to be tested;

b. correctly and quickly verifying entries by specifying a range of expected entries; and c. promoting, in the repeating installation to be tested, collision between the reception and transmission processes of line control data from the tester 11, thereby forming a severe testing environment.

(2) Various protocol tests with virtual terminals

A repeating installation has two functions, i.e., a function of collecting data from other installations and a function of distributing the data to a target installation. Accordingly, if the repeating installation is used as the tester 11, data from the repeating installation 1 to be tested is collected by the tester. Accordingly, in the tester 11 for example, a collecting function unit of a receiver of the test packet receiver 33 collects the data, an intensive receiver 33-1 receives the collected data, and an acknowledge unit 33-2 examines the data.

Further, the various protocol transmitting functions of the repeating installation are provided with a self-transmission-reception function for transmitting data by itself, so that the repeating installation may serve as a test terminal. As a result, without installing terminals which have OSs for various protocols, are difficult to obtain, and are expensive, for various kinds of protocols, it is possible to evaluate the various protocol functions of a repeating installation to be tested. Testing functions may be developed with a limited repeating installation, and it is possible to reduce the number of development processes.

(3) Outgoing path one-way test

According to the present invention, when a receiver receives test data, the receiver does not return the same to a sender but verifies the test data by itself.

As shown in FIG. 5, when the tester 10 transmits test data to the tester 11 through the repeating installation 1, the test data TD involves packet losses due to, for example, congestion, at a reception point L1 and at a transmission point L2 of the repeating installation 1.

According to the prior art, checking test data is carried out by returning transmitted test data from the receiver and by checking the same at a sender. As a result, it is impossible to check the data separately in an outgoing path and in a returning path and examine which of the outgoing and returning paths has caused data loss, and in addition, the outgoing path doubles the quantity of data to be lost compared with that of the one-way test, thereby deteriorating testing efficiency.

The present invention (a) transmits test data transmitted from the tester 10 to the tester 11 through the repeating installation 1 to be tested, (b) receives the test data at the tester 11, and (c) verifies the received test data at the tester 11. Needless to say, the tester 11 holds the same data as the test data transmitted from the tester 10 and compares them with each other, to thereby verify the test data. Instead, as mentioned below, an expected value code may be held to carry out logical verification.

This indicates packets lost in the outgoing path and improves testing efficiency. In addition, locating a fault position is limited to the one way of the outgoing path.

(4) Using transmission-only terminal

Figure 6A:
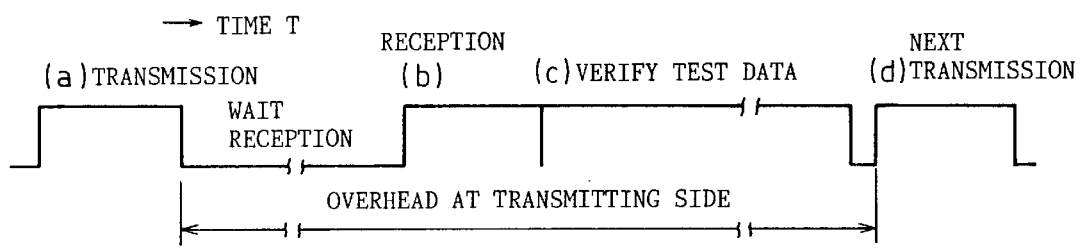
FIGS. 6A and 6B explain the operation of a transmission dedicated terminal.

According to the conventional test, as shown in FIG. 6A, (a) a sender test terminal transmits test data through a repeating installation to be tested, a receiver test terminal receives the same and returns it to the sender, (b) the sender test terminal receives the same, (c) verifies the received test data, and (d) transmits the next test data.

As a result, at the sender test terminal, after transmitting first test data and until the same is received by the receiver, returned thereby, and received by the sender, there is a reception wait time in which the sender is unable to output test data, thereby reducing load on the repeating installation to be tested.

According to the present invention, for transmission and reception of test data (packets), the testers 10 and 11 are each allocated a single function, to serve as a transmission tester or a reception tester.

Figure 6B:
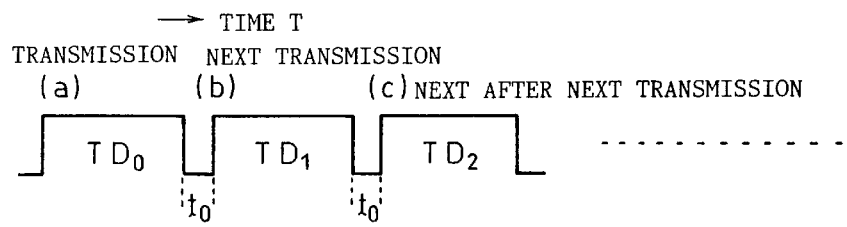

Consequently, the test packet transmitter 22 of the tester 10 transmits, as shown in FIG. 6B, test data TD0, TD1, TD2, and the like at short intervals of t0. This results in increasing transmission load on the repeating installation 1 to be tested, to carry out a test under heavy load. In this case, a program may be provided with a timer to variably control the intervals.

(5) Reception performance improving function

Figure 7:
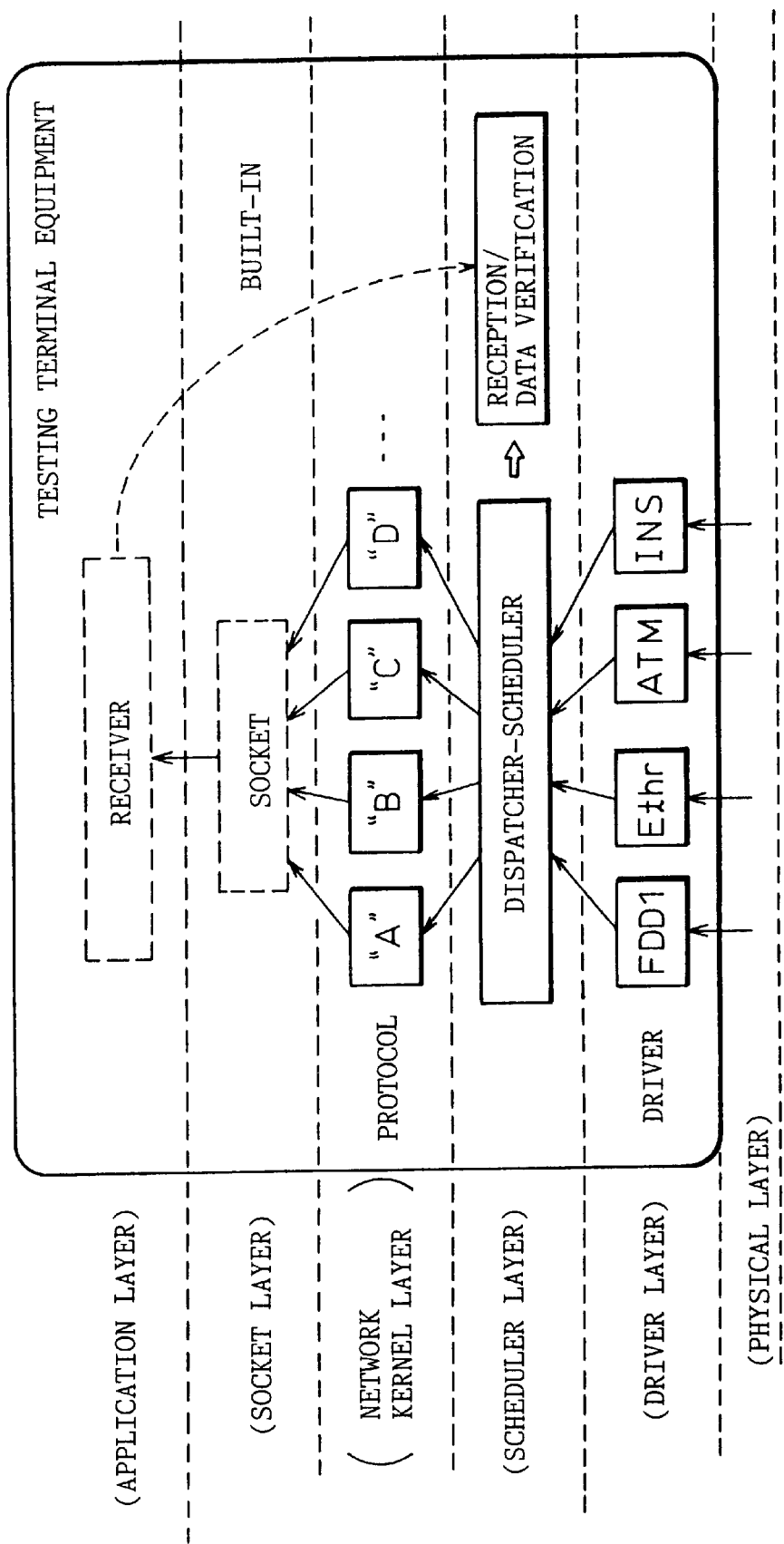
FIG. 7 explains a reception performance improved state according to the present invention.

A standard terminal forms a network interface with, as shown in FIG. 7, a 6-layer structure including, from the bottom, a physical layer, a driver layer, a scheduler layer, a network kernel layer, a socket layer, and an application layer.

The tester 11 according to the present invention arranges, in the scheduler layer, a reception/data acknowledge unit having a testing-receiving function and a data acknowledging function. The socket layer and application layer are omitted.

Accordingly, according to the present invention, test data transmitted from the physical layer is amplified by, depending on the kind thereof, a fiber distribution data interface driver FDDI, an Ethernet driver Ethr, an advanced information network system driver INS, an asynchronous transmission mode driver ATM, etc., of the driver layer, is transmitted by a dispatcher-scheduler arranged in the scheduler layer to the reception/data acknowledge unit, is received thereby, and is verified.

If the data is a protocol, the dispatcher-scheduler transfers it to a corresponding one of protocol tasks A, B, C, D, and the like arranged in the network kernel layer.

In this way, the present invention incorporates the test data receiving function and data acknowledging function in the scheduler layer, to omit memory copy conventionally required for data transmission of the network kernel layer→the socket→the receiver, thereby reducing overheads due to the memory copy process and improving the total performance of the tester.

Arranging the reception/data acknowledge unit just after the driver layer realizes the detection of double packets. Namely, if double packets are produced due to some reason in the hardware of the repeating installation 1 to be tested, the prior art tester receives them in the application layer and automatically abandons one of the double packets, and therefore, is unable to detect the double packets.

However, the present invention receives them in a layer below the application layer, and if it receives double packets, it transfers them as they are without abandoning one of them, so that it is possible to detect the double packets.

Consequently, the reception performance of a test terminal is improved, the number of test data packets to be abandoned is reduced, and testing efficiency is improved. In addition, the checking of the hardware of a repeating installation to be tested is carried out more correctly.

(6) Logical examination of test data

A technique of examining test data will be explained. The test data has a format of, for example, FIG. 8A. At a heading part, there are a packet identification code K indicating that the packet is test data, a destination network address P, an originator network address S, a packet size L indicating the size (byte length) of the packet, a time stamp (year, month, day, hours, minutes, seconds, etc.) T indicating transmission time, a serial packet number B, and an expected value code C, to form a 7-byte head, which is followed by test data TES and final data E.

As the test data TES, numbers following the expected value code C are sequentially written as shown in FIG. 8C. In this example, C=13, and the size of the packet is 20 bytes, and therefore, the test data TES contains numbers 14, 15, 16, up to 25. Accordingly, the expected value code C to the final data E are a series of numbers of 13 to 26.

When such test data is received, a numerical expression of FIG. 8B is used to determine whether or not the expected value code C is correct. In this example, if it is correctly received, C=13, L=20, and E=26, and therefore:

$$C+(L-7)=13+(20-7)=26=E$$

Therefore, it is determined that the expected value code C is normal.

In this way, if the received expected value code C is normal, +1 is added, i.e., a value of C+1=14 is compared with a first value TES1 of the next test data. If they agree with each other, +1 is again added, and it is compared with the next TES2 to see if they agree with each other. These are successively carried out up to the final data. If all of them show agreement, it is determined that the received test data is correct.

In this way, by providing test data with expected value data, a receiver can logically confirm by itself the normality of the test data according to a program. As a result, there is no need of a memory for storing an expected value in advance, and because test data is logically compared in a register, memory access is required only for received test data. Since there is no memory access for the expected value, the testing time is halved. There is no need to visually check test data stored in a terminal or printed, and a large amount of data can be examined in a short time.

It is naturally possible to employ a fixed data pattern as test data, which is simply collated to greatly reduce time and labor for analyzing a fault. It is also possible to employ a lattice data pattern as test data to promote a cross talk fault, and based on the same, carry out a test.

(7) Calculation of packet loss rate by adding serial numbers

The present invention adds, as shown in FIG. 8A, a packet transmission serial number to test data. Accordingly, a receiver can evaluate, by itself alone, the number of abandoned packets.

The receiver obtains a packet loss rate as follows:

(a) The receiver counts and records the number of received packets.

(b) The packet transmission serial number of a presently received latest packet is used as a modulus of the number of transmitted packets, and a packet loss rate is calculated as follows:

$$\text{packet loss rate } (\%)=[\{(\text{last serial number})-(\text{total number of received packets})\}/(\text{last serial number})]\times 100$$

(c) The calculation is carried out, for example, every 1000 or 10000 serial numbers.

In this way, by providing each packet with a transmission serial number, a receiver can obtain, by itself, a packet loss rate. Since it is calculated only in an outgoing path, the evaluation accuracy is twice as good as that of the prior art that calculates the same based on a total in outgoing and returning paths. In addition, the present invention is capable of identifying fault locations in a narrower range.

(8) Network capacity examination

Figure 9:
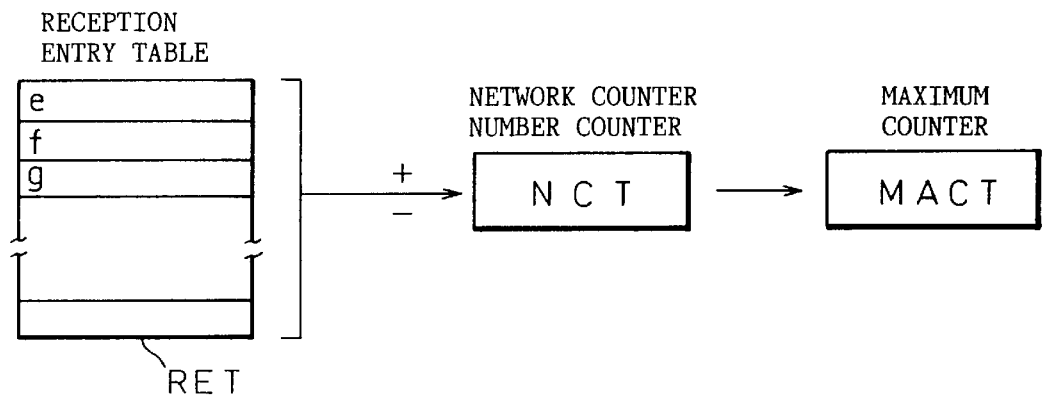
FIG. 9 explains network capacity verification according to the present invention.

To examine the network capacity, i.e., the number of networks the repeating installation 1 to be tested can handle simultaneously, the present invention provides a receiver terminal, for example, the tester 11 with a network counter NCT and a maximum counter MACT, as shown in FIG. 9.

Through the repeating installation 1 to be tested, the test data shown in FIG. 8A is transmitted, and the tester 11 reads a destination network address P and prepares a reception entry table RET into which the destination network address is written.

When writing the destination network address in the reception entry table RET upon receiving the test data, the network counter NCT is simultaneously incremented by +1. In this way, whenever test data is sequentially received by the tester 11 and entries are additionally written into the reception entry table RET, the network counter NCT is sequentially incremented by +1.

Whenever the tester 11 completes the checking of test data and deletes one entry in the table RET, the network counter NCT is deducted by one.

The output of the network counter NCT is supplied to the maximum counter MACT, which holds a maximum counted by the network counter NCT. As a result, it is possible to examine an allowable peak value of the numbers of networks passed through the repeating installation 1 to be tested.

Operations of the embodiment of the present invention of FIG. 2 will be explained. As shown in FIG. 2, the repeating installation 1 to be tested is connected to networks NTA and NTB consisting of, for example, WANs (Wide Area Networks) that operate at a slower speed than LANs (Local Area Networks). The network NTA is connected to the tester 10, and the network NTB is connected to the tester 11. Although not shown in FIG. 2, the tester 10 is virtually connected to, as shown in FIG. 1, the dummy networks a, b, c, d, and the like, and the tester 11 is imaginarily connected to the dummy networks e, f, g, h, and the like.

A. When testing the repeating installation 1, an operator enters the dummy network addresses ea, fa, ga, ha, and the like of the dummy networks e, f, g, h, and the like into the test parameter input unit 13-1 of the console 13 connected to the tester 11, and starts a test program B for testing the repeating installation 1.

As a result, according to the test program B, the controller 31 makes the line control data transmitter 32 broadcast the dummy network addresses ea, fa, ga, ha, and the like to the network NTB including the repeating installation 1 to be tested. In this way, line control data is transmitted.

B. The line controller 2 of the repeating installation 1 to be tested receives the dummy network addresses, i.e., the line control data transmitted in the above A.

C. The line controller 2 sets the line control data for the transmitter-receiver 2 side in the line control table PT1 in the transmitter-receiver 3, as shown in FIG. 3B. This forms a virtual network of a test object. At this time, the line controller 2 sends the data to the tester 10 through the transmitter-receiver 3. In the tester 10, the line control data receiver 23 receives the data, and the controller 21 compares it with an expected value, determines whether or not they are correct, and displays a result of the determination on the display 122 through the HMI processing unit 24, to let the operator recognize it.

D. Next, on the tester 10, the operator enters a dummy network address connected to the transmitter-receiver 4 into the test parameter input unit 12-1 of the console 12 connected to the tester 10, and starts a test program A to transmit test data for the entered address. As a result, the controller 21 transmits the test data to the dummy network address, e.g., "ea" specified by the operator.

This transmitter-receiver 3 refers to the line control table PT1 shown in FIG. 3B, to recognize that the test data to the dummy network address ea must be transmitted to the transmission-reception path $P_5$, and the test data is transferred to the transmitter-receiver 4, which has the transmission-reception path $P_5$, and is transmitted from the transmission-reception path $P_5$. In this way, the test data is transmitted to the tester 11.

E. In this way, in the tester 11, the transmitted test data is collectively received by the test packet receiver 33.

F. In the tester 11, the test packet receiver 33 carries out an examination according to, for example, the logic technique of FIG. 8. Namely, the test packet receiver 33 confirms the normality of an expected value code C from the received test data, and based on this, examines the test data of FIG. 8A packet by packet.

G. If any error is detected during the examination of the test data, the controller 31 displays the same on the display 13-2 of the console 13 through the HMI processing unit 34, to inform the operator of it.

H. In this regard, upon receiving the test data, the controller 31 prepares the reception entry table RET as shown in FIG. 9 and increments the network counter NCT by +1 for every entry. After the completion of examination of the test data, the entry is deleted from the reception entry table RET and the network counter NCT is decreased by one. A maximum of the network counter NCT is held in the maximum counter MACT. As a result, it is possible to examine an allowable peak value of the number of networks passed through the repeating installation 1 to be tested.

I. Further, the controller 31 calculates a packet loss rate according to the technique (7) mentioned above at intervals of a given number of packets or a given elapsed time upon receiving the test data, and a result thereof is passed through the HMI processing unit 34 and is displayed on the display 13-2 of the console 13.

J. The controller 31 repeatedly transmits the line control data at intervals of, for example, one to three seconds. At this time, by dropping entries in the line control data to be transmitted at regular intervals, disturbance is given to the line control process of the repeating installation to be tested, to thereby examine a triggered update function.

K. In the tester 10, the controller 21 may change the transmission intervals of test data to regular intervals according to an instruction entered by the operator, or the transmission intervals may be dynamically changed by dynamically variably setting a program timer of the test program A. In addition, the transmission intervals of test data may be elongated to test the repeating installation in a WAN circuit.

L. The transmission of line control data according to the test program B mentioned in the above A is repeated at intervals of, for example, one to three seconds.

M. These tests are repeatedly carried out until an operator's instruction is given.

According to the present invention, testers are connected to virtual networks and virtual terminals, to test a repeating installation, and therefore, without installing actual network media, the number of virtual network addresses can be increased to a number allowable for the repeating installation to be tested, to carry out an evaluation test on the repeating installation to be tested.

The present invention employs repeating installations as the testers 10 and 11 and receives packets passing through the repeating installations, to carry out an evaluation test on a repeating installation to be tested.

Figure 10A:
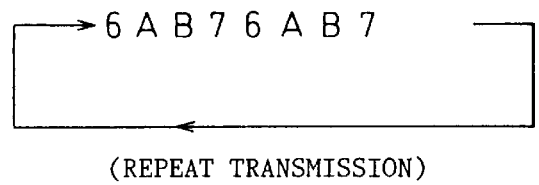
FIGS. 10A and 10B explain a cross talk acceleration state according to lattice data.
Figure 10B:
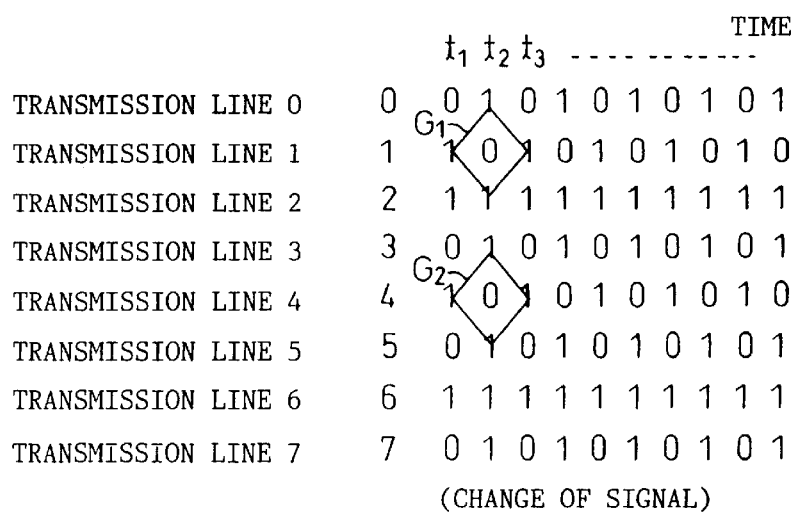

When test data is lattice data as shown in FIGS. 10A and 10B, it is possible to promote the generation of cross talk failure in data on the system bus 5 in the repeating installation 1 to be tested, to test the influence of cross talk.

Now, the tester 10 repeatedly sends a pattern of, for example, "6AB7" in hexadecimal notation as shown in FIG. 10A to the transmitter-receiver 3 of the repeating installation 1 to be tested. The transmitter-receiver 3 receives the serial data, converts the same into parallel data, and sends the parallel data to the system bus 5, for example, eight bits by eight bits.

As a result, at time t1, transmission lines 0 to 3 provide "6," i.e., "0110" and transmission lines 4 to 7 provide "A," i.e., "1010." At time t2, the transmission lines 0 to 3 provide "B," i.e., "1011" and the transmission lines 4 to 7 provide "7," i.e., "0111."

In this way, as indicated with G1 and G2 in FIG. 10B, for example, "0" is surrounded by "1"s in the system bus, and this state easily occurs. In this case, "0" in each G1 and G2 has the large probability of being changed to "1" due to cross talk. Accordingly, by using such a lattice data pattern, combinations of values of adjacent transmission lines always align and appear, to carry out a cross talk fault generation promoting test on data in, for example, the system bus 5, thereby carrying out a cross talk test. Lattice data patterns are not limited to those of FIGS. 10A and 10B.

According to a first aspect of the present invention, unlike the conventional tests, there is no need to prepare several hundreds of networks or several thousands of terminals. Tests are carried out only by installing several networks and several repeating installations (when testers are formed of repeating installations) or test terminals, to examine the repeating function (path) of a repeating installation with a maximum network structure. As a result, facility costs and installation spaces are greatly reduced. In addition, under a large-scale network environment, the performance of the repeating installation is evaluated.

According to a second aspect of the present invention, various kinds of protocols are simultaneously run, to test mutual interference among the protocols. Without installing many terminals that have OSs for respective protocols, are difficult to obtain, and are expensive, it is possible to evaluate various protocol functions of a repeating installation to be tested.

According to a third aspect of the present invention, a receiver does not return test data to a sender and examines the test data by itself. Unlike the prior art that returns received data to a sender, which examines the test data, and therefore, is unable to examine data packets lost in the returning path, the third aspect is capable of carrying out a test without packet loss in a returning path, thereby improving testing efficiency. Further, identifying a fault location such as a packet lost location can be limited to one way, i.e., an outgoing path, to make the identification easier.

According to a fourth aspect of the present invention, the transmission intervals of test data transmitted from a tester are regularly set or dynamically varied according to an operator's instruction or a program. As a result, it is possible to put large transmission load on a repeating installation to be tested.

According to a fifth aspect of the present invention, a scheduler layer can receive and examine test data. Compared with the prior art that arranges a receiver in an application layer, the fifth aspect requires no memory copy for each transfer step in a network kernel layer→a socket layer→the receiver as required in the prior art, thereby reducing overheads due to the memory copy process, improving the total performance of a test terminal, increasing reception performance, reducing abandoned packets, and improving testing efficiency.

According to a sixth aspect of the present invention, test data contains an expected value, and therefore, a receiver by itself can logically examine the correctness of the test data according to a program. As a result, a memory area for storing the expected value in advance is not needed, the test data is logically compared on a register, and therefore, a memory access is needed only for the received test data, to halve a testing time because there is no memory access for the expected value. In addition, there is no need to visually examine the received test data. Due to these factors, it is possible to correctly examine a large amount of test data in a short time.

According to a seventh aspect of the present invention, test data includes a serial packet number, so that a transmitter alone can evaluate the number of abandoned packets.

According to an eighth aspect of the present invention, it is possible to automatically record a maximum value of the number of networks passed through a repeating installation to be tested, to easily examine an allowable peak value of the number of passed networks.

According to a ninth aspect of the present invention, it is possible to check to see if line control data is correct on a tester that transmits test data.

According to a tenth aspect of the present invention, it is possible to correctly carry out a test on a repeating installation for a WAN circuit having many repeating objective terminals.

According to an eleventh aspect of the present invention, it is possible to detect double packets, to more correctly examine the hardware of a repeating installation to be tested.

According to a twelfth aspect of the present invention, it is possible to provide the line control process of a repeating installation to be tested with disturbance, to test the triggered update function thereof, thereby improving the test.

According to a thirteenth aspect of the present invention, test data contains a fixed data pattern, and therefore, a receiver prepares a corresponding comparison pattern, to check the test data very simply, thereby reducing time and labor when analyzing and examining a fault.

According to a fourteenth aspect of the present invention, test data has a lattice data pattern to promote a cross talk fault, to thereby enriching the contents of the test.

What is claimed is:

1. A system for testing the repeating installation, comprising:

a repeating installation including a first transmitter-receiver, a second transmitter-receiver having a plurality of outputs, and a line controller connected between said first transmitter-receiver and said second transmitter-receiver;

a first tester connected to said first transmitter-receivers for sending test data and a destination address;

a second tester having an inputted connected to one of said plurality of outputs of said second transmitter-receivers and an output virtually connected to a virtual network including a plurality of virtual terminals, for receiving said test data, said virtual network and said virtual terminals being virtually present and being not physically present; and an input unit connected to said first tester for entering, as said destination address, a virtual address of said virtual network or virtual terminals;

said line controller having a control table for making a correspondence between said virtual address and a path directing from said line controller to said second tester in response to said virtual address so that, when said test data and said virtual address are sent from said first tester to said line controller, said line controller establishes a connection between said first tester and said second tester through said repeating installation by referring to said control table to send said test data to said second tester, so that said second tester receives said test data without sending the test data to said virtual network or said virtual terminal, said second tester determines whether or not the received virtual address is directed to said second tester and determines whether or not the received test data is correct by checking the contents of the received test data to examine said repeating installation.

2. The system for testing a repeating installation according to claim 1, wherein repeating installations are used as the testers, to receive packets passed through a repeating installation.

3. The system for testing a repeating installation according to claim 1, wherein said first tester transmits a packet including a first expected value code arranged in said packet, a size of said packet, a second expected value code arranged in said packet, and test data, a predetermined first logical relationship being provided among said first expected value code, said second expected value code, and said packet size, and predetermined second logical relationship being provided among said first expected value code and said test data; and said second tester receives said packet to determine whether or not said first predetermined logical relationship is maintained among the received first expected value code, the received second expected value code, and the received packet size, and if said predetermined first logical relationship is maintained, said second tester determines whether or not the received test data is correct by checking whether or not said second predetermined logical relationship is maintained among the receive first expected value code and the received test data.

4. The system for testing a repeating installation according to claim 1, wherein the transmission intervals of test data transmitted from the tester are regular, or are dynamically varied, or are set according to an operator's instruction.

5. The system for testing a repeating installation according to claim 1, wherein the tester receives and examines test data in a scheduler layer.

6. The system for testing a repeating installation according to claim 1, wherein test data contains an expected value code so that the tester that receives the test data may examine the test data.

7. The system for testing a repeating installation according to claim 1, wherein test data contains a serial packet number so that the tester that receives the test data may evaluate the degree of packet loss.

8. The system for testing a repeating installation according to claim 1, wherein the tester on the receiver aside for receiving test data is provided with a counter that is incremented by one when an entry is written to a reception entry table and is decremented by one when an entry is deleted from the table, and maximum hold means for holding a maximum counted by the counter, to detect the maximum number of networks of the repeating installation to be tested.

9. The system for testing a repeating installation according to claim 1, wherein line control data is checked by the tester that transmits test data.

10. The system for testing a repeating installation according to claim 1, wherein the transmission intervals of test packets are elongated to verify the operation of the repeating installation to be tested in a WAN circuit.

11. The system for testing a repeating installation according to claim 1, wherein test data receiving and verifying means is arranged just after a driver layer of the tester, to detect double packets.

12. The system for testing a repeating installation according to claim 1, wherein the entries of line control information to be transmitted are dropped at regular intervals, to disturb the line control processing of the repeating installation to be tested.

13. The system for testing a repeating installation according to claim 1, wherein test data has a fixed data pattern.

14. The system for testing a repeating installation according to claim 1, wherein test data has a lattice data pattern.

* * * * *

UNITED STATES PATENT AND TRADEMARK OFFICE
CERTIFICATE OF CORRECTION

PATENT NO. : 6,034,948
DATED : March 7, 2000
INVENTOR(S) : Tetsuzi NAKAMURA et al.

It is certified that error appears in the above-identified patent and that said Letters Patent is hereby corrected as shown below:

Col. 15, line 28, change "aside" to --side--.

Signed and Sealed this

Sixth Day of February, 2001

Attest:

Attesting Officer

Q. TODD DICKINSON
Director of Patents and Trademarks